Sept. 16, 1930.   W. G. FLUHARTY   1,776,219
SIGNAL RELAY SYSTEM
Filed Jan. 7, 1928
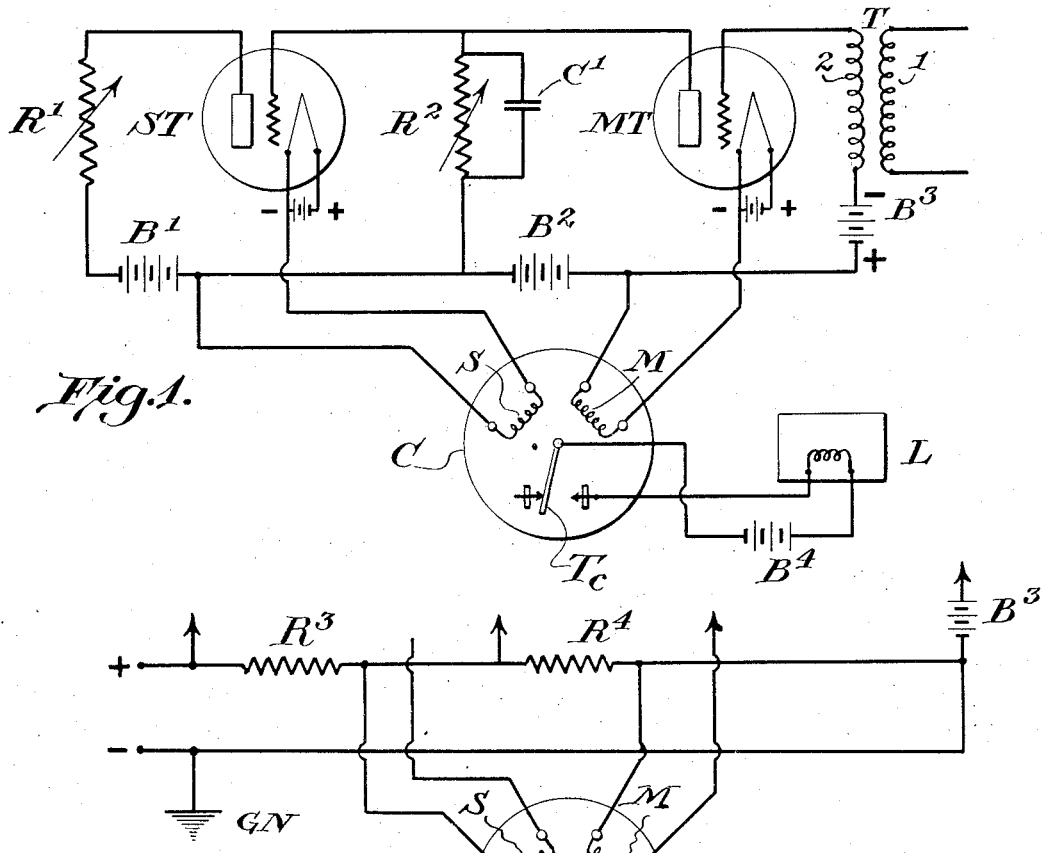
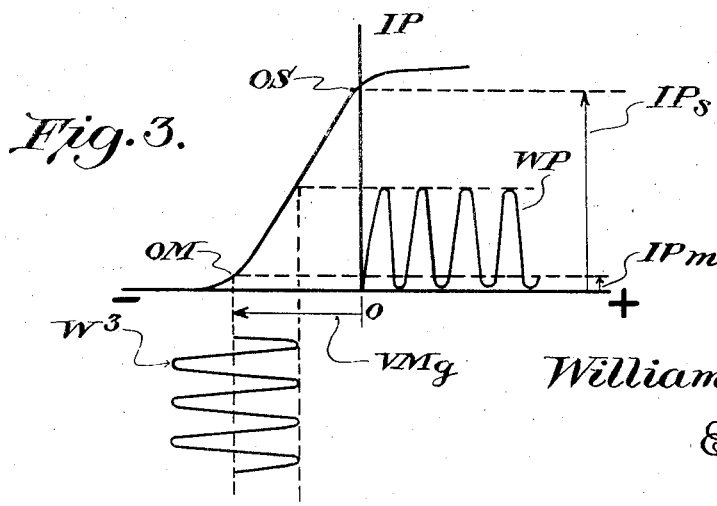
Inventor
William G. Fluharty
Eugene C. Brown
Attorney Patented Sept. 16, 1930

1,776,219

UNITED STATES PATENT OFFICE

WILLIAM G. FLUHARTY, OF ROCKVILLE CENTER, NEW YORK, ASSIGNOR TO THE WESTERN UNION TELEGRAPH COMPANY, OF NEW YORK, N. Y., A CORPORATION OF NEW YORK

SIGNAL-RELAY SYSTEM

Application filed January 7, 1928. Serial No. 245,128.

My invention relates to a signal receiving and relaying system, and in particular to a system for receiving, detecting and relaying signals transmitted by carrier current.

My invention is particularly adapted for the reception of telegraphic signals transmitted by carrier current.

An object of my invention is to devise a signal relay system having a high degree of reliability and response in operation, and also having a greater margin against extraneous interference.

A further object of my invention is to devise a relay system in which a polar relay of standard type may be operated by vacuum tubes of the usual three-electrode construction.

My invention is illustrated in the accompanying drawing in which—

Fig. 1 is a circuit diagram showing the electrical connections to the various parts.

Fig. 2 illustrates a modification of the arrangement shown in Fig. 1.

Fig. 3 is a diagram illustrating the conditions of operation of my invention.

Referring to Fig. 1 the signals to be detected are impressed upon primary winding 1 of transformer T. The secondary 2, of transformer T is connected to the grid of a vacuum tube MT. The grid circuit of the vacuum tube MT is completed through a biasing battery $B^3$, through the coil M of relay C to the negative side of the filament of tube MT. The plate circuit of tube MT may be traced from the negative side of the filament, through coil M of relay C, through plate battery $B^2$, and through adjustable resistance $R^2$ to the plate. Resistance $R^2$ is shunted by a condenser $C'$. C is a polarized relay of usual construction having a spacing coil S and a marking coil M adapted to control the position of relay armature or tongue $T_c$. The relay C controls in a well known manner a sounder or other signaling device L, which may be operated by battery $B^4$ connected in the circuit controlled by the relay C.

In a similar manner the plate circuit of vacuum tube ST includes coil S of relay C, plate battery $B'$, and adjustable resistance $R'$. The grid circuit of vacuum tube ST extends from the negative side of the filament, through coil S of relay C, and through resistance $R^2$ connected in the plate circuit of tube MT to the grid.

The signals received by the transformer T may be either alternating current waves modulated in accordance with telegraphic signals or they may be pulsating waves transmitted in accordance with telegraphic signals. In either case the secondary coil of the transformer T will have induced therein alternating currents corresponding to the signals transmitted. The potential of battery $B^3$ is of such value that the plate current normally flowing in vacuum tube MT is reduced substantially to zero. This is illustrated in Fig. 3 of the drawing where OM indicates the point of operation of the tube MT upon its characteristic curve. The magnitude of the grid voltage of tube MT is indicated by the line $VM_g$, and the normal plate current is indicated by the line $IP_m$.

When no signals are being received, the plate current flowing in tube MT is very small and, therefore, the current flowing through coil M has very little effect upon the armature $T_c$ of relay C. Also, the potential drop due to the plate current of tube MT flowing through resistance $R^2$ is very small; therefore, the negative potential impressed upon the grid of tube ST due to the plate current of tube M flowing through resistance $R^2$ is of small magnitude. Accordingly, the plate current of tube ST will be relatively large, and the coil S of relay C will maintain the tongue $T_c$ in its spacing position. The point OS in Fig. 3 indicates the normal operating point of tube ST on its characteristic curve, the line $IP_s$ indicating the magnitude of the normal plate current.

Upon receipt of signals, the negative alternations of the current will produce substantially no change in the plate current of tube MT, whereas the positive alternations of the signaling current will produce a substantial increase in the plate current of tube MT. In other words, tube MT acts as a rectifier or detector for the incoming signals. The resulting plate current WP due to an incoming signal current $W^s$ is illustrated in Fig. 3 of the accompanying drawing. It will be noted that the plate current is a pulsating current which comprises a direct current component and an alternating current component.

Condenser C', shunted around resistance R², is for the purpose of smoothing out the alternating current component, and maintaining the voltage drop across the resistance at approximately a constant value. Due to the increase in plate current in vacuum tube MT, the drop in potential across resistance R² increases and, therefore, the grid of tube ST becomes more negative, and thereby causes a decrease in the plate current flowing in tube ST.

It will thus be seen that an incoming signal produces an increase in the plate current of vacuum tube MT and a decrease in plate current of vacuum ST, and since the currents for these two tubes flow respectively through the "marking" and "spacing" coils of relay C, the coil M will be stronger than the coil S, and tongue T will be moved to the "marking" position, thereby operating the signaling device L. It will be noted that vacuum tube relay ST energizes the spacing coil S of relay C, and vacuum tube relay MT energizes the marking coil M, and that vacuum relay MT also controls the operation of vacuum tube relay ST.

Where it is not desirable or convenient to use two separate batteries B' and B² for the plate current supply sources of tubes ST and MT, the plate currents for these tubes may be supplied from a common source of direct current power from across two resistances R³ and R⁴ connected in series to said source as shown in Fig. 2. One side of the source of current may be grounded as shown at GN. The remainder of the circuit shown in Fig. 2 is the same as that shown in Fig. 1.

My relay system possesses a large margin of operation due to the fact that the polar relay always has current flowing through it either in a spacing position or in a marking position. Also greater freedom from line interference and distortion is secured, provided the line interference does not exceed the incoming signal in amplitude.

The signaling currents may be supplied to transformer T directly from a telegraph line, or amplifying and tuning circuits may be interposed between the relay and the line or antenna if carrier currents of radio frequencies are used.

It is obvious that the details of my system may be changed in various ways without departing from the invention.

I claim:—

1. In combination, a polarized relay having an armature and two windings corresponding respectively to the spacing and marking positions of said relay, a vacuum tube relay, the plate circuit of which includes one of said windings, an adjustable resistance in said plate circuit, means for biasing the grid of said relay negative to maintain the normal plate current in said relay at a low value, a second vacuum tube relay the plate circuit of which includes the other winding, the grid of said second vacuum tube relay being connected to the plate end of said resistance, whereby the grid of said second tube will be negatively biased in accordance with the value of the plate current in the first vacuum tube relay and may be varied in accordance with the adjustment of said resistance, and means for supplying signaling currents to the input circuit of said first vacuum tube relay.

2. In the combination set forth in claim 1, means for shunting the alternating current component from said resistance and maintaining the voltage drop thereacross at approximately a constant value.

In testimony whereof I affix my signature.

WILLIAM G. FLUHARTY.